United States Patent
Ishimaru et al.

(10) Patent No.: US 12,431,295 B2
(45) Date of Patent: Sep. 30, 2025

(54) ELECTROLYTIC CAPACITOR WITH IMPROVED EQUIVALENT SERIES AND RESISTANCE AND PRODUCTION METHOD THEREFOR

(71) Applicant: Panasonic Intellectual Property Management Co., Ltd., Osaka (JP)

(72) Inventors: Yoshiaki Ishimaru, Saga (JP); Takayuki Matsumoto, Saga (JP); Tatsuji Aoyama, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 517 days.

(21) Appl. No.: 17/929,724

(22) Filed: Sep. 5, 2022

(65) Prior Publication Data
US 2022/0415580 A1     Dec. 29, 2022

Related U.S. Application Data (63) Continuation of application No. PCT/JP2021/013176, filed on Mar. 29, 2021.

(30) Foreign Application Priority Data

Mar. 31, 2020    (JP) ................ 2020-064945

(51) Int. Cl.
*H01G 9/00*      (2006.01)
*H01G 9/02*      (2006.01)
(Continued)

(52) U.S. Cl.
CPC ........... *H01G 9/0036* (2013.01); *H01G 9/028* (2013.01); *H01G 9/151* (2013.01); *H01G 9/02* (2013.01)

(58) Field of Classification Search
CPC ........... H01G 9/15–151; H01G 9/0029; H01G 9/0036; H01G 11/84–86; H01G 9/02;
(Continued)

(56) References Cited

U.S. PATENT DOCUMENTS

| | | |
|---|---|---|
| 2009/0109602 A1 | 4/2009 | Kakuma et al. |
| 2015/0287540 A1 | 10/2015 | Koseki et al. |
| 2016/0379759 A1 | 12/2016 | Matsumoto et al. |

FOREIGN PATENT DOCUMENTS

| | | |
|---|---|---|
| CN | 104919555 A | 9/2015 |
| JP | 4916416 B | 4/2012 |

(Continued)

OTHER PUBLICATIONS

Machine Translation, Koseki et al., WO 2014098006 A1, Jun. 26, 2014 (Year: 2014).*

(Continued)

*Primary Examiner* — Scott B Geyer
(74) *Attorney, Agent, or Firm* — Rimon P.C.

(57) ABSTRACT

A method for producing an electrolytic capacitor, the electrolytic capacitor including a capacitor element including an anode body and a cathode body each having a foil shape. The anode body includes a dielectric layer on a surface of the anode body. The method includes a step of forming a capacitor element precursor by winding or stacking a separator, the anode body, and the cathode body with the separator interposed between the anode body and the cathode body, a step of impregnating the capacitor element precursor with a treatment liquid containing a polyhydric alcohol, a solvent, and a conductive polymer component, a step of impregnating the capacitor element precursor with a liquid component after the step of impregnating the capacitor element precursor with the treatment liquid, and a step of (Continued)

forming the capacitor element by eluting the polyhydric alcohol into the liquid component.

10 Claims, 2 Drawing Sheets

(51) Int. Cl.
    *H01G 9/028*     (2006.01)
    *H01G 9/15*     (2006.01)

(58) Field of Classification Search
    CPC ........... H01G 11/52; H01G 9/022–035; H01G 11/54–64
    See application file for complete search history.

(56) References Cited

FOREIGN PATENT DOCUMENTS

| JP | 2016-004914 A | 1/2016 |
|---|---|---|
| WO | 2014/098006 | 6/2014 |
| WO | 2015/146070 | 10/2015 |

OTHER PUBLICATIONS

International Search Report of PCT application No. PCT/JP2021/013176 dated Jun. 15, 2021.
English Translation of Chinese Office Action dated Apr. 28, 2025 for the related Chinese Patent Application No. 202180024065.8.

\* cited by examiner

ELECTROLYTIC CAPACITOR WITH IMPROVED EQUIVALENT SERIES AND RESISTANCE AND PRODUCTION METHOD THEREFOR

BACKGROUND

1. Technical Field

The present invention relates to an electrolytic capacitor and a method for producing the same.

2. Description of the Related Art

As a capacitor having a small size, large capacitance, and low equivalent series resistance (ESR), there is an electrolytic capacitor including an anode foil having a dielectric layer, a cathode body, and a conductive polymer attached to the dielectric layer. In particular, a hybrid electrolytic capacitor in which a conductive polymer as a solid electrolyte and a liquid component (electrolytic solution) are used in combination is expected because it can reduce leak current (for example, Japanese Patent No. 4916416).

In the hybrid electrolytic capacitor, attempts have been made to contain various solute components (supporting salts) in the liquid component for imparting a restoration function of the dielectric layer and improving characteristics such as withstand voltage.

SUMMARY

A method for producing an electrolytic capacitor according to an aspect of the present disclosure is a method for producing an electrolytic capacitor, the electrolytic capacitor including a capacitor element having an anode body and a cathode body each having a foil shape. The anode body includes a dielectric layer on a surface of the anode body. The method includes the following step (i), step (ii), step (iii), and step (iv). In step (i), a capacitor element precursor is formed by winding or stacking a separator, the anode body, and the cathode body with the separator interposed between the anode body and the cathode body. In step (ii), the capacitor element precursor is impregnated with a treatment liquid containing a polyhydric alcohol, a solvent, and a conductive polymer component. In step (iii), the capacitor element precursor is impregnated with a liquid component after step (ii). In step (iv), the capacitor element is formed by eluting the polyhydric alcohol into the liquid component.

An electrolytic capacitor according to another aspect of the present disclosure includes a capacitor element. The capacitor element includes a separator, an anode body and a cathode body each having a foil shape, the anode body and the cathode body facing each other with the separator disposed between the anode body and the cathode body, a solid electrolyte layer disposed between the anode body and the cathode body, and a liquid component. The solid electrolyte layer contains a polyhydric alcohol and a conductive polymer. The solid electrolyte layer has an uneven distribution part where the polyhydric alcohol is unevenly much distributed.

The production method of the present disclosure can improve the characteristics of the electrolytic capacitor.

DETAILED DESCRIPTIONS OF EMBODIMENTS

In the above-described conventional technique, as a result of containing a large amount of various solute components (supporting salts) in the electrolytic solution, storage stability of the electrolytic solution deteriorates, and the solute components tends to precipitate particularly at a low temperature (for example, below freezing). As a result, the characteristics of the capacitor tend to deteriorate after long-term use or in a low-temperature environment. In addition, the solute components may react with the conductive polymer to deteriorate the characteristics of the capacitor or to promote the deterioration of the characteristics of the conductive polymer.

A method for producing an electrolytic capacitor according to an exemplary embodiment of the present disclosure is a method for producing an electrolytic capacitor, the electrolytic capacitor including a capacitor element including an anode body and a cathode body each having a foil shape. The anode body includes a dielectric layer on a surface of the anode body. The method including the following steps (i) to (iv):

(i) a step of forming a capacitor element precursor by winding or stacking a separator, the anode body, and the cathode body with the separator interposed between the anode body and the cathode body;

(ii) a step of impregnating the capacitor element precursor with a treatment liquid containing a polyhydric alcohol, a solvent, and a conductive polymer component;

(iii) a step of impregnating the capacitor element precursor with a liquid component after step (ii); and (iv) a step of forming the capacitor element by eluting the polyhydric alcohol into the liquid component.

According to the production method of the present exemplary embodiment, in step (ii), the polyhydric alcohol and the conductive polymer component are attached to the capacitor element precursor, and then in step (iii), the capacitor element precursor is impregnated with the liquid component, whereby the conductive polymer adheres to the surface of the anode body and/or the separator, and an electrolytic capacitor excellent in characteristics can be produced. In particular, an electrolytic capacitor having a low equivalent series resistance (ESR) can be realized. In addition, it is possible to inhibit the characteristics in a low-temperature environment from deteriorating.

The polyhydric alcohol includes an organic compound containing a plurality of hydroxyl groups (—OH) bonded to a carbon atom (for example, an organic compound that is not a polymer), and includes, for example, a saccharide such as glucose. Other examples of the polyhydric alcohol include mannitol, sorbitol, xylitol, volemitol, pentaerythritol, trimethylolpropane, and glycerin. Mannitol, sorbitol, xylitol, volemitol, pentaerythritol, and the like are also called sugar alcohols. As the polyhydric alcohol, a compound having three or more hydroxy groups may be used.

Since the polyhydric alcohol has a plurality of hydroxy groups, the polyhydric alcohol easily binds to hydroxy groups present on the surfaces of the anode body and the separator. This causes the conductive polymer to be fixed to the anode body and the separator through impregnation of the capacitor element precursor with the treatment liquid containing the polyhydric alcohol, the solvent, and the conductive polymer component, followed by removal of the solvent by drying. As a result, the conductive polymer adheres to the anode body, which can reduce the ESR of the electrolytic capacitor.

In step (iv), since the polyhydric alcohol is eluted into the liquid component, the melting point of the liquid component decreases due to decrease in the solidifying point. Thus, the viscosity of the liquid component can be maintained low even in a low-temperature environment. This improves low-temperature characteristics. After step (iv), the polyhydric alcohol is contained in a range from 0.1 mass % to 1 mass %, inclusive, with respect to the total amount of the liquid component.

In step (ii), the polyhydric alcohol attaches to be incorporated into the conductive polymer layer, and may be unevenly much distributed near the conductive polymer. A conductive polymer layer (solid electrolyte layer) may be formed between the anode body or the cathode body and the separator. A part of the polyhydric alcohol may be unevenly much distributed in a state of being precipitated in the conductive polymer layer without being eluted even after the impregnation with the liquid component. The polyhydric alcohol is considered to be unevenly much distributed in a dispersed state in the conductive polymer layer. That is, it is considered that the solid electrolyte layer is not dense but has a hollow part like a sponge, and the polyhydric alcohol is precipitated in the hollow part. The liquid component and the polyhydric alcohol (not eluted into the liquid component) may be unevenly much distributed in the hollow part even after step (iv). Such a structure can improve the characteristics of the electrolytic capacitor.

In step (ii), the treatment liquid may contain an acid component in addition to the polyhydric alcohol. The treatment liquid may contain a base component in addition to the polyhydric alcohol and the acid component. That is, in step (ii), the acid component may be contained in the treatment liquid in the form of a salt with the base component.

The acid component contained in the electrolytic capacitor has an action of supplying oxygen to a damaged part and repair the damaged part when the oxide film constituting the dielectric layer is damaged. Containing the acid component in the liquid component enables the damage generated in the dielectric layer to be repaired, which can maintain the leak current (LC) low and the withstand voltage high. Meanwhile, when the liquid component contains an excessive amount of the acid component, the acid component precipitates in a low-temperature environment, which tends to deteriorate the characteristics. In addition, the equivalent series resistance (ESR) tends to increase with a long-term use.

In the production method of the present exemplary embodiment, the acid component may also be unevenly much distributed near the conductive polymer like the polyhydric alcohol by including an acid component in the treatment liquid of step (ii). After step (iv), a part of the acid component is eluted into the liquid component, but a part of the acid component is unevenly much distributed near the conductive polymer and near the anode body. This enables a high restoration effect of the dielectric layer to be obtained with a limited amount of the acid component contained in the liquid component. As a result, it is possible to reduce the leak current and increase the withstand voltage while inhibiting a decrease in low-temperature characteristics and an increase in ESR due to long-term use.

The acid component may also have a function of inhibiting deterioration due to desorption of a dopant contained in the conductive polymer. Thus, the liquid component containing the acid component inhibits a decrease in electric conductivity due to dedoping of the conductive polymer, which can maintain the ESR low even in long-term use. In addition, the withstand voltage improves.

The liquid component may contain an aprotic solvent or a protic solvent. The aprotic solvent tends to dissolve the acid component, but hardly dissolves the polyhydric alcohol. Thus, the acid component can be selectively eluted into the liquid component with respect to the polyhydric alcohol. This inhibits a deterioration due to dedoping of the conductive polymer, which can maintain the ESR low. On the other hand, the protic solvent hardly dissolves the acid component but tends to dissolve the polyhydric alcohol. Thus, the polyhydric alcohol can be selectively eluted into the liquid component with respect to the acid component. This causes the acid component to be unevenly much distributed near the anode body, which can increase the effect of restoring the dielectric layer and achieve an excellent effect of inhibiting an increase in leak current. It is also possible to improve the effect of improving the low-temperature characteristics by the polyhydric alcohol.

The liquid component may also contain a nonpolar solvent. The proportion of the aprotic solvent, the protic solvent, and the nonpolar solvent in the liquid component may be appropriately adjusted according to the required characteristics of the electrolytic capacitor.

The protic solvent means a solvent having a solubility parameter (SP value) by Hildebrand of more than or equal to 14. The aprotic solvent means a solvent having the solubility parameter (SP value) of more than or equal to 5 and less than 14.

Hereinafter, the present exemplary embodiment is more specifically described with appropriate reference to the drawings. The following exemplary embodiments do not limit the present invention.

(Step (i))

First, a capacitor element precursor is formed by winding or stacking a separator an anode body, and a cathode body with the separator interposed between the anode body and the cathode body. The capacitor element precursor is an element before an electrolyte layer is formed.

The anode body having a foil shape may be formed by a known method. For example, first, a metal foil as a raw material of the anode body is prepared, and the surface of the metal foil is roughened. The roughening may be performed, for example, by etching using a direct current electrolyzing method or an alternating current electrolyzing method. Next, the dielectric layer is formed on the roughened surface of the metal foil. The dielectric layer may be formed, for example, by subjecting the metal foil to an anodizing treatment. Through the anodizing treatment of the metal foil, the surface of the metal foil is oxidized, and the dielectric layer that is an oxide film is formed. The anode body is thus formed.

As necessary, lead terminals for electrical connection are connected to the anode body and the cathode body.

When the electrolytic capacitor is a wound-type capacitor, the capacitor element precursor may be formed, for example, by collectively winding a foil-shaped anode body, a foil-shaped cathode body, and a separator. At this time, the anode body, the cathode body, and the separator are wound to dispose the separator between the anode body and the cathode body.

When the electrolytic capacitor is a stacked-type capacitor, the capacitor element precursor may be formed, for example, by collectively folding a foil-shaped anode body, a foil-shaped cathode body, and a separator in a zigzag manner. At this time, the anode body, the cathode body, and the separator are folded to dispose the separator between the anode body and the cathode body.

(Step (ii))

Next, the capacitor element precursor is impregnated with a treatment liquid containing a polyhydric alcohol, a solvent, and a conductive polymer component. The solvent may be water, a mixture of water and a non-aqueous solvent, or a non-aqueous solvent. The non-aqueous solvent is not particularly limited, and for example, a protic solvent or an aprotic solvent may be used. Examples of the protic solvent include alcohols such as methanol, ethanol, propanol, butanol, ethylene glycol, and propylene glycol, and ethers such as formaldehyde and 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

As the polyhydric alcohol, the above-described compounds may be used. The polyhydric alcohol preferably has a high melting point. The higher the melting point, the easier the polyhydric alcohol penetrates deep into pores of the anode body having a porous part in the step of drying the solvent after the impregnation with the treatment liquid. Thus, in a deep part of the porous part of the anode body, the hydroxy group of the polyhydric alcohol and the hydroxy group on the surface of the anode body bind to each other, and the adhesion of the conductive polymer can improve. This can improve the ESR. The melting point of the polyhydric alcohol may be higher than or equal to 80° C., higher than or equal to 100° C., or higher than or equal to 150° C. For the above-described polyhydric alcohols, the melting point of glucose is about 146° C. to 150° C., the melting point of mannitol is about 165° C. to 169° C., the melting point of sorbitol is about 93° C. to 95° C., the melting point of xylitol is about 92° C. to 97° C., the melting point of pentaerythritol is about 257° C. to 260° C., and the melting point of trimethylolpropane is about 56° C. to 58° C. The melting points of these substances may vary depending on the structure (stereoisomer).

The solvent of the treatment liquid may be, for example, water. The impregnation may be performed, for example, by immersing the capacitor element precursor in an aqueous treatment liquid. The aqueous treatment liquid is a treatment liquid containing water. The content proportion of water in the liquid (solvent) constituting the aqueous treatment liquid is, for example, in a range from 50 mass % to 100 mass %, inclusive.

The immersion time is not particularly limited, and may be, for example, from 1 minute to 20 minutes, inclusive. The entire capacitor element precursor may be immersed in the aqueous treatment liquid, or only a part of the capacitor element precursor may be immersed in the aqueous treatment liquid. For example, only less than or equal to 50% of the capacitor element precursor in a longitudinal direction (axial direction in the case of a wound body) may be immersed in the aqueous treatment liquid.

The impregnation with the treatment liquid may be performed at room temperature or at a temperature other than room temperature (for example, a temperature higher than room temperature). The impregnation with the treatment liquid may be performed under atmospheric pressure or under an environment other than the atmospheric pressure (for example, under reduced pressure).

The content proportion of the polyhydric alcohol in the treatment liquid may range from 0.1 mass % to 10 mass %, inclusive. By setting the content proportion of the polyhydric alcohol more than or equal to 0.1 mass %, an effect of reducing the ESR can be obtained. Meanwhile, as the content proportion of the polyhydric alcohol increases, the viscosity of the treatment liquid increases. Thus, impregnation with the conductive polymer may become difficult. The content proportion of the polyhydric alcohol may be less than or equal to 10 mass % from the viewpoint of easy impregnation with the conductive polymer.

In the treatment liquid, the conductive polymer component may be a conductive polymer or a precursor of a conductive polymer. That is, the capacitor element precursor may be impregnated with the treatment liquid in which the conductive polymer is dispersed to form a layer of the conductive polymer (solid electrolyte layer) in the space between the anode body and the separator. Alternatively, the solid electrolyte layer may be formed by polymerizing a precursor of a conductive polymer (for example, raw material monomers) on the dielectric layer of the anode body. The solid electrolyte layer may be composed of one layer or may be composed of two or more layers of different materials by performing impregnation in a plurality of times. As the material of the conductive polymer, those described later may be used.

The concentration of the conductive polymer in the treatment liquid in which the conductive polymer is dispersed (polymer dispersion) preferably ranges from 0.5 mass % to 10 mass %, inclusive. The average particle diameter D50 of the conductive polymer ranges, for example, preferably from 0.01 μm to 0.5 μm, inclusive. Here, the average particle diameter D50 is a median diameter in a volume particle size distribution obtained by a particle size distribution measuring apparatus using dynamic light scattering. The polymer dispersion may be obtained by, for example, a method for dispersing the conductive polymer in a liquid dispersion medium or a method for polymerizing a precursor monomer in the liquid dispersion medium and generating particles of the conductive polymer.

The treatment liquid may contain an acid component in addition to the conductive polymer component and the polyhydric alcohol. The acid component has a function of inhibiting dedoping of the conductive polymer. The treatment liquid may further contain a base component.

The acid component may include a compound containing an acidic functional group. Examples of the acidic functional group include a carboxy group, a hydroxy group, a sulfo group, a phosphoric acid group, a nitro group, and an oxo group. The acid component may include a carboxylic acid, a phosphoric acid, a sulfonic acid, a boric acid, and/or a salt thereof. More specifically, the acid component includes maleic acid, phthalic acid, benzoic acid, pyromellitic acid, resorcinic acid, and borodisalicylic acid. The compound containing an acidic functional group may be a polycarboxylic acid or a compound having a phenolic hydroxy group.

As the acid component, a polycarboxylic acid and a monocarboxylic acid may be used.

Examples of the polycarboxylic acid include aliphatic polycarboxylic acids ([saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid]; and [unsaturated polycarboxylic acids such as maleic acid, fumaric acid, and itaconic acid]), aromatic polycarboxylic acids (such as phthalic acid, isophthalic acid, terephthalic acid, trimellitic acid, and pyromellitic acid), and alicyclic polycarboxylic acids (such as cyclohexane-1,2-dicarboxylic acid and cyclohexene-1,2-dicarboxylic acid).

Examples of the monocarboxylic acid include aliphatic monocarboxylic acids (having 1 to 30 carbon atoms) ([saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid]; and [unsaturated monocarboxylic acids such as acrylic acid, methacrylic acid, and oleic acid]), aromatic monocarboxylic acids (such as benzoic acid, cinnamic acid, and naphthoic acid), and oxycarboxylic acids (such as salicylic acid, mandelic acid, and resorcinol acid).

Among these, maleic acid, phthalic acid, benzoic acid, pyromellitic acid, and resorcinol acid have high conductivity and are thermally stable, and they are preferably used.

Examples of the inorganic acid include a carbon compound, a hydrogen compound, a boron compound, a sulfur compound, a nitrogen compound, and a phosphorus compound. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid.

Further, a composite compound of an organic acid and an inorganic acid may be used as the acid component. Examples of the composite compound include borodiglycolic acid, borodioxalic acid, and borodisalicylic acid.

The treatment liquid may contain a base component in addition to the acid component.

Examples of the base component include metal hydroxides such as sodium hydroxide and potassium hydroxide, and nitrogen-containing basic compounds such as aliphatic amines and cyclic amines. Among them, an imidazole compound, a benzimidazole compound, and an alicyclic amidine compound (pyrimidine compound, imidazoline compound) among compounds having an alkyl-substituted amidine group can provide a capacitor having high electric conductivity and excellent impedance performance. Examples of the compound having an alkyl-substituted amidine group include 1,8-diazabicyclo [5,4,0]undecene-7, 1,5-diazabicyclo [4,3,0]nonene-5, 1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methybenzimidazole. As the base component, a quaternary salt of a compound having an alkyl-substituted amidine group may be used. Specific examples thereof include imidazole compounds, benzimidazole compounds, and alicyclic amidine compounds (pyrimidine compound, imidazoline compound) that are quaternized with an alkyl group or an arylalkyl group having 1 to 11 carbon atoms.

Further, a tertiary amine may also be used as the base component, and examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (such as dimethylphenylamine, methylethylphenylamine, and diethylphenylamine). Among them, trialkylamines are preferable because they have high conductivity, and it is more preferable to contain at least one selected from the group consisting of trimethylamine, dimethylethylamine, methyldiethylamine, and triethylamine. As the base component, a secondary amine such as dialkylamines, a primary amine such as a monoalkylamine, or ammonia may also be used.

The base component may be contained in the treatment liquid in the form of a salt with the acid component. Examples of the salt with the acid component include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

After the impregnation, the solvent contained in the treatment liquid is removed by drying, whereby a solid electrolyte layer is formed between the anode body and the separator, and the polyhydric alcohol is precipitated, so that at least a part of the polyhydric alcohol adheres to the anode body, the separator, and the solid electrolyte layer. When the treatment liquid contains an acid component or a base component, these components may also precipitate and attach to the anode body, the separator, and the solid electrolyte layer.

The conductive polymer, the polyhydric alcohol, and the acid component attach to the anode body to cover at least a part of the dielectric layer on the surface of the anode body, and they may be attached to fill at least a part of the pores of the roughened anode body.

The drying is usually performed by heating. The drying may be performed under atmospheric pressure or under an environment other than the atmospheric pressure (for example, under reduced pressure). The drying temperature may be a temperature higher than or equal to the melting point of the polyhydric alcohol, and it may be a temperature higher than or equal to the boiling point of the solvent under the pressure for performing drying (for example, higher than or equal to 100° C.). In a preferred example, the drying temperature is a temperature of higher than or equal to the boiling point of the solvent under the pressure at which the drying is performed (for example, higher than or equal to 100° C.), and a temperature of higher than or equal to the melting point of the polyhydric alcohol under the pressure at which the drying is performed and less than the boiling point. Drying at a temperature of higher than or equal to the melting point of the polyhydric alcohol allows the permeability of the polyhydric alcohol into the capacitor element precursor to increase. The drying temperature may be, for example, higher than or equal to 150° C., or higher than or equal to 180° C.

The impregnation with the treatment liquid (step (ii)) and the drying step may be repeated as necessary. Repeating step (ii) can increase the amounts of the polyhydric alcohol and the acid component to be precipitated.

(Step (iii))

Subsequently, the capacitor element precursor is impregnated with a liquid component. The liquid component may be a substance that is liquid at room temperature (25° C.) or may be a substance that is liquid at a temperature at which the electrolytic capacitor is used.

The method for impregnating the capacitor element precursor with the liquid component is not particularly limited. For example, a method of immersing the capacitor element precursor in the liquid component contained in a container is simple and preferable. The impregnation is preferably performed under reduced pressure, for example, in an atmosphere ranging from 10 kPa to 100 kPa, inclusive. Examples of the liquid component include the above-described materials.

The liquid component includes a solvent that dissolves polyhydric alcohols. The liquid component may contain another solute that dissolves in the solvent as necessary. The liquid component may contain the above-described acid component and/or the base component. The acid component and/or the base component may be selected from the compounds exemplified in the above-described treatment liquid.

The liquid component may be a non-aqueous solvent or a mixture of a non-aqueous solvent and an ionic substance (a solute, for example an organic salt) dissolved in the non-aqueous solvent (that is, an electrolytic solution). The non-aqueous solvent may be an organic solvent or may be an ionic liquid. The non-aqueous solvent is preferably a high-boiling-point solvent. Examples of the non-aqueous solvent include polyhydric alcohols such as ethylene glycol (EG) and propylene glycol, cyclic sulfones such as sulfolane (SL), lactones such as γ-butyrolactone (GBL), amides such as N-methylacetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, and formaldehyde.

As the non-aqueous solvent, a polymer solvent may be used. Examples of the polymer solvent include polyalkylene glycol, a derivative of polyalkylene glycol, and a compound obtained by substituting at least one hydroxyl group in a polyhydric alcohol with polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Further, examples of the polymer solvent include an ethylene glycol-propylene glycol copolymer, an ethylene glycol-butylene glycol copolymer, and a propylene glycol-butylene glycol copolymer. One of these non-aqueous solvents may be used singly, or two or more thereof may be used in mixture.

The pH of the liquid component may be less than 7 or less than or equal to 5 to suppress dedoping of the dopant in the conductive polymer. The pH of the liquid component may be adjusted to the above-described acidity after the elution of the acid component after step (iv).

The liquid component may be a protic solvent or an aprotic solvent. The protic solvent tends to elute the polyhydric alcohol component in step (iv) described later. Thus, low-temperature characteristics can be enhanced by the eluted polyhydric alcohols. On the other hand, the aprotic solvent tends to elute the acid component in step (iv). In this case, the adhesion of the conductive polymer to the anode body is improved, which can lower the ESR. It is preferable that more than or equal to 50 mass % of the total amount of the liquid component be an aprotic solvent, and less than 50 mass % be a protic solvent. It is more preferable that more than or equal to 60 mass % of the total amount of the liquid component be an aprotic solvent, and less than 40 mass % be a protic solvent.

The liquid component may be an electrolytic solution but does not have to be an electrolytic solution. The liquid component may be substantially free of solute and may substantially have no electric conductivity. For example, in step (iii), electric conductivity $X1$ of the liquid component is preferably less than or equal to 1 μS/cm.

(Step (iv))

Subsequently, the liquid component is caused to elute the polyhydric alcohol. A capacitor element is thus obtained. Step (iv) may be performed simultaneously with or in parallel with step (iii).

By the impregnation with the liquid component, at least a part of the polyhydric alcohol, the acid component, and/or the base component precipitated in step (ii) is eluted. As a result, the electric conductivity of the liquid component increases.

After step (iv), electric conductivity $X2$ of the liquid component from which the polyhydric alcohol and/or the acid component has been eluted is higher than $X1$ ($X2>X1$), and is preferably less than or equal to 500 μS/cm. Electric conductivity $X2$ of the liquid component may range from 0.1 μS/cm to 500 μS/cm, inclusive, and more preferably from 0.1 μS/cm to 100 μS/cm, inclusive, from 0.5 μS/cm to 500 μS/cm, inclusive, or from 0.5 μS/cm to 100 μS/cm, inclusive.

When the treatment liquid containing an acid component is used in step (ii), the acid component may be eluted into the liquid component in step (iv). The eluted acid component inhibits a decrease in electric conductivity due to dedoping of the conductive polymer and can maintain the ESR low even in long-term use. In addition, the withstand voltage improves. However, when the elution of the acid component is excessive, the ESR increases due to long-term use, and low-temperature characteristics may deteriorate. To inhibit an increase in the ESR due to long-term use and inhibit a decrease in low-temperature characteristics, the content proportion of the acid component in the liquid component after step (iv) ranges preferably from 0.01 mass % to 2 mass %, inclusive, with respect to the total amount of the liquid component containing the acid component.

When a treatment liquid containing a base component is used in step (ii), the base component may be eluted into the liquid component. In that case, the content proportion of the base component in the liquid component after step (iv) is preferably less than or equal to 2 mass % with respect to the total amount of the liquid component containing the base component to further inhibit an increase in the ESR due to long-term use.

The content proportion of each solute such as an acid component, a base component, and a polyhydric alcohol in the liquid component may be measured by extracting the liquid component inside the electrolytic capacitor with a centrifugal separator and performing microscopic FT-IR analysis or liquid chromatography.

The liquid component after step (iv) may contain a solvent (for example, water) of the treatment liquid that has not been removed in the drying step after step (ii). When the amount of moisture contained in the liquid component is large, moisture vaporizes when heat is applied to the electrolytic capacitor in a reflow step or the like, and airtightness of a case that seals the electrolytic capacitor may be deteriorated by vapor. After step (iv), the content proportion of moisture in the liquid component is preferably less than or equal to 5 mass %, and more preferably less than or equal to 3 mass %.

An electrolytic capacitor is produced using the capacitor element formed in step (iv). The method for producing an electrolytic capacitor using the capacitor element is not particularly limited, and a known method may be applied. For example, the capacitor element may be put in a case and then sealed.

Hereinafter, a configuration example of the electrolytic capacitor produced by the production method of the present exemplary embodiment will be described in detail.

[Electrolytic capacitor]

An electrolytic capacitor according to an exemplary embodiment of the present invention is an electrolytic capacitor including a capacitor element, wherein the capacitor element includes a separator, an anode body and a cathode body each having a foil shape, the anode body and the cathode body facing each other with the separator disposed between the anode body and the cathode body, a solid electrolyte layer disposed between the anode body and the cathode body, and a liquid component. The solid electrolyte layer contains a polyhydric alcohol and a conductive polymer. The solid electrolyte layer has an uneven distribution part where the polyhydric alcohol is unevenly much distributed. The liquid component (electrolytic solution or solvent) and the conductive polymer are used as an electrolyte.

Figure 1:
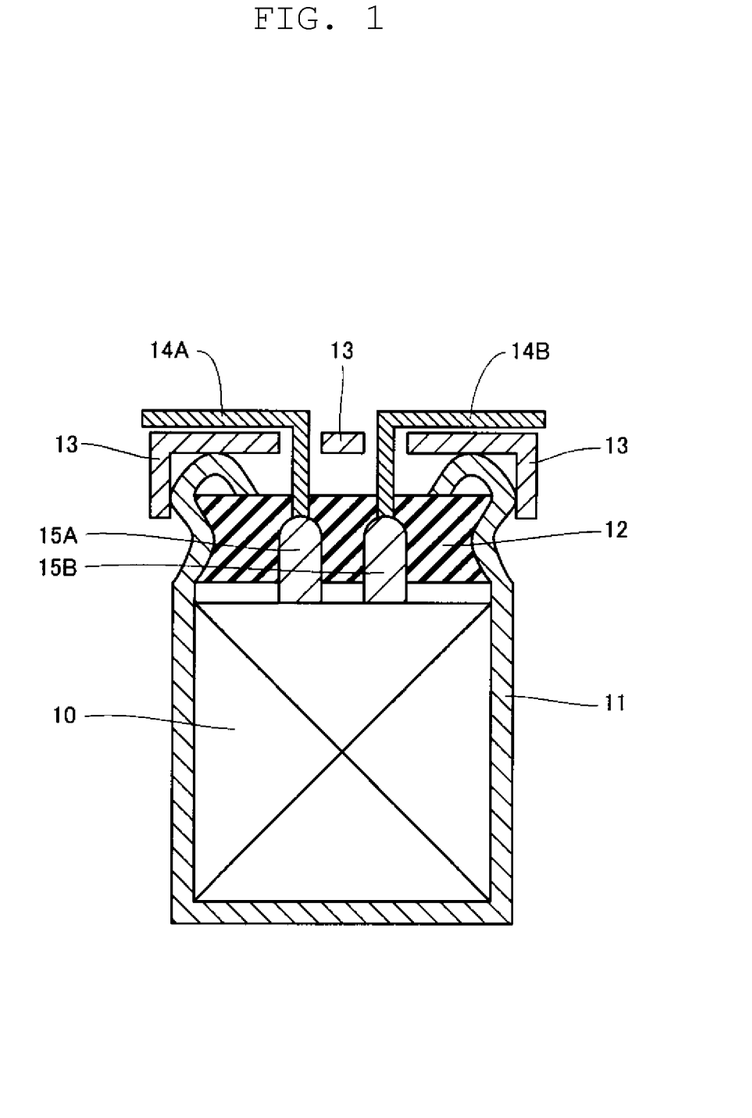
FIG. 1 is a sectional view schematically illustrating an electrolytic capacitor according to an exemplary embodiment of the present disclosure.
Figure 2:
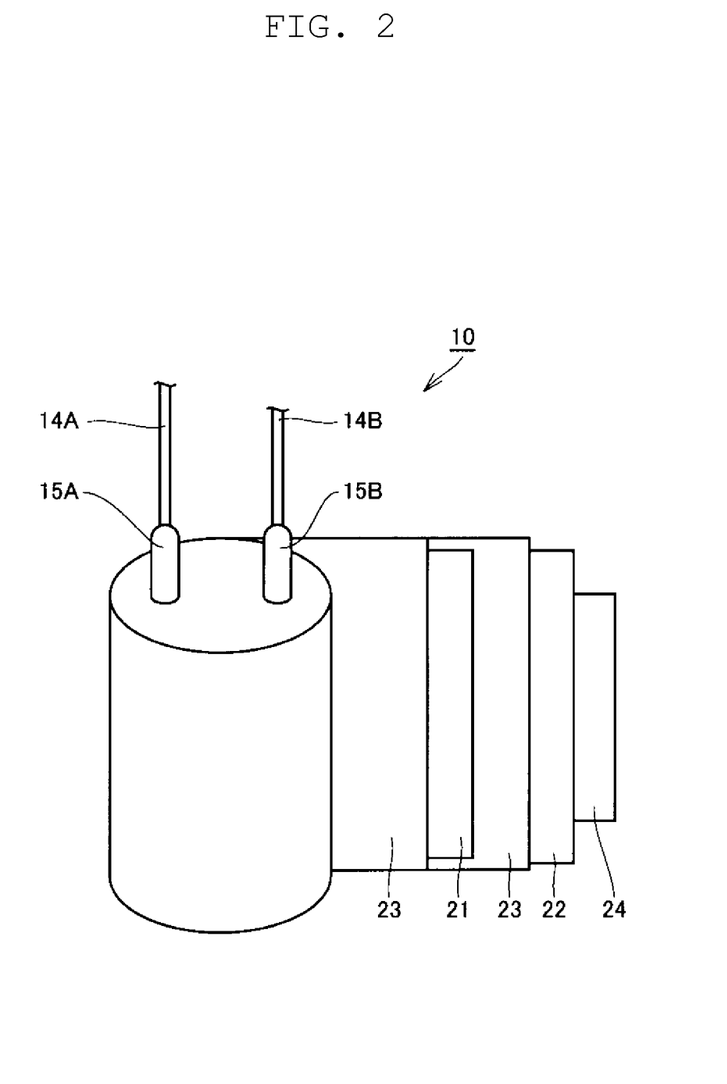
FIG. 2 is a schematic view in which a part of a wound body included in the electrolytic capacitor is unrolled.

FIG. 1 is a schematic sectional view illustrating an electrolytic capacitor according to the present exemplary embodiment, and FIG. 2 is a schematic view in which a part of a wound body included in the electrolytic capacitor is unrolled.

As illustrated in FIG. 1, the electrolytic capacitor includes, for example, capacitor element 10, bottomed case 11 that houses capacitor element 10, sealing member 12 that closes an opening of bottomed case 11, seat plate 13 that covers sealing member 12, lead wires 14A, 14B led out from sealing member 12 and penetrating seat plate 13, lead tabs 15A, 15B respectively connecting the lead wires and electrodes of capacitor element 10, and a liquid component (not illustrated). Capacitor element 10 is housed in an outer case together with the liquid component. The vicinity of an opening end of bottomed case 11 is drawn inward, and the opening end is curled to be crimped to sealing member 12.

Capacitor element 10 is produced by, for example, attaching a conductive polymer to a wound body illustrated in FIG. 2. The wound body includes anode body 21 having a dielectric layer, cathode body 22 containing a first metal made of a valve metal, and separator 23 disposed therebetween. The conductive polymer attaches to the anode body 21 to cover at least a part of the surface of the dielectric layer of anode body 21 and to form a solid electrolyte layer. Capacitor element 10 further includes lead tab 15A connected to anode body 21 and lead tab 15B connected to cathode body 22.

Anode body 21 and cathode body 22 are wound with separator 23 interposed therebetween. The outermost circumference of the wound body is fixed by fastening tape 24. FIG. 2 illustrates a state in which a part of the wound body is unrolled before the outermost circumference of the wound body is fixed. Anode body 21 includes a metal foil whose surface has been roughened to have irregularities, and the dielectric layer is formed on a principal surface of the metal foil having irregularities.

(Anode Body)

The anode body includes a dielectric layer on a surface of the anode body. As the anode body, a metal foil having a dielectric layer formed on a surface of the metal foil may be used. The type of metal contained in the metal foil is not particularly limited, but a valve metal, such as aluminum, tantalum, niobium, or titanium, and an alloy of a valve metal are preferable from the viewpoint of easily forming the dielectric layer. Among them, a simple metal such as aluminum and an alloy such as an aluminum alloy are preferable. Usually, the surface of the anode body is roughened, and a dielectric layer is formed on the roughened surface of the metal foil.

(Cathode Body)

As the cathode body, a metal foil may be used. The type of metal contained in the metal foil is not particularly limited, and for example, a valve metal such as aluminum, tantalum, niobium, or titanium, or an alloy of a valve metal may be used. The metal contained in the metal foil may be a simple metal such as aluminum or an alloy such as an aluminum alloy. The surface of the cathode body may be roughened but does not have to be roughened. The surface of the cathode body may be provided with an anodization film or may be provided with a film of a metal different from the metal that constitutes the cathode body (different type of metal) or a nonmetal film. Examples of the different type of metal and the nonmetal include metals such as titanium and nonmetals such as carbon.

(Separator)

As the separator, a sheet-shaped material that may be impregnated with an electrolyte may be used, and for example, a sheet-shaped material that has insulating properties and may be impregnated with an electrolyte may be used. The separator may be a woven fabric, a nonwoven fabric, or a porous membrane. Examples of the material of the separator include cellulose, polyethylene terephthalate, polybutylene terephthalate, polyphenylene sulfide, vinylon, nylon, aromatic polyamide, polyimide, polyamide-imide, polyetherimide, rayon, and glassy materials.

(Conductive Polymer)

Examples of the conductive polymer include polypyrrole, polythiophene, polyfuran, polyaniline, and polyacetylene. These may be used singly or in combination of two or more thereof or may be a copolymer of two or more of monomers. A weight-average molecular weight of the conductive polymer is not particularly limited and ranges from 1000 to 100000, inclusive, for example.

In the present specification, polypyrrole, polythiophene, polyfuran, polyaniline, polyacetylene, and the like mean polymers having polypyrrole, polythiophene, polyfuran, polyaniline, polyacetylene, and the like as a basic skeleton, respectively. Thus, polypyrrole, polythiophene, polyfuran, polyaniline, polyacetylene, and the like may also include derivatives thereof. Examples of polythiophene include poly (3,4-ethylenedioxythiophene) (PEDOT).

A dopant may be added to the conductive polymer. It is desirable to use a polymer dopant from the viewpoint of inhibiting dedoping of the dopant from the conductive polymer. Examples of the polymer dopant include an anion of, for example, polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymer dopants may be used singly or in combination of two or more thereof. These polymer dopants may be a homopolymer or a copolymer of two or more of monomers. In particular, polystyrenesulfonic acid (PSS) is preferable.

The weight-average molecular weight of the dopant is not particularly limited, but ranges preferably, for example, from 1000 to 100000, inclusive, from the viewpoint that a homogeneous solid electrolyte layer is likely to be formed.

The conductive polymer may be poly(3,4-ethylenedioxythiophene) doped with polystyrenesulfonic acid.

In the solid electrolyte layer, the polyhydric alcohol (not illustrated) is unevenly much distributed. A part of the polyhydric alcohol is eluted into the liquid component, but the remaining part is unevenly much distributed and precipitated in a state of being dispersed in the solid electrolyte layer.

In the above exemplary embodiment, a wound-type electrolytic capacitor has been described, but an application range of the present disclosure is not limited to the above, and the present invention can also be applied to other electrolytic capacitors, for example, a chip-type electrolytic capacitor using a metal sintered body as an anode body, or a stacked-type electrolytic capacitor using a metal plate as an anode body.

EXAMPLES

Hereinafter, the present invention is specifically described with reference to Examples and Comparative Examples, but the present invention is not limited to the following Examples.

Example 1

In the present Example, a wound-type electrolytic capacitor (diameter 8 mm×length 12 mm) having a rated voltage of 100 V and a rated capacitance of 18 μF was produced. A specific method for producing the electrolytic capacitor will be described below.

The electrolytic capacitor illustrated in FIG. 1 was produced in the following manner, and its characteristics were evaluated.
(1) Production of Capacitor Element
(Preparation of Cathode Body)

As a cathode body, an Al foil (aluminum foil) having a thickness of 50 μm was used.
(Preparation of Anode Body)

An Al foil having a thickness of 120 μm was prepared. The Al foil was subjected to a direct current etching treatment to roughen its surface. Subsequently, the Al foil was subjected to an anodizing treatment to form a dielectric layer (thickness: about 70 nm), whereby an anode body was obtained. The dielectric layer was formed by immersing the Al foil in an ammonium adipate solution and then performing an anodizing treatment at 70° C. for 30 minutes while applying a voltage of 180 V to the Al foil. Thereafter, the anode body was cut into a predetermined size, whereby an anode body was prepared.
(Production of Wound Body)

An anode lead tab and a cathode lead tab to each of which a lead wire was connected were respectively connected to the prepared anode body and the cathode body having a conductor layer on an end face, the anode body and the cathode body were wound with a separator interposed therebetween and with the lead tabs, and an outer surface was fixed by a fastening tape to produce a wound body, whereby a capacitor element precursor was obtained.

The capacitor element precursor was immersed in an ammonium adipate solution and then subjected to an anodizing treatment again at 70° C. for 60 minutes while a voltage of 180 V was applied to the anode body, whereby a dielectric layer was formed mainly on an end face of the anode body.
(Preparation of Treatment Liquid)

A mixed solution was prepared by dissolving 3,4-ethylenedioxythiophene and polystyrenesulfonic acid as a dopant in ion-exchanged water. While the obtained mixed solution was being stirred, iron (III) sulfate (oxidizing agent) dissolved in ion-exchanged water was added to the mixed solution to cause a polymerization reaction. After the reaction, the obtained reaction liquid was dialyzed to remove unreacted monomers and excessive oxidant, whereby a polymer dispersion containing about 2 mass % of polyethylenedioxythiophene doped with polystyrenesulfonic acid was obtained.

Mannitol (MAN) as a polyhydric alcohol was added to and mixed with the polymer dispersion to obtain a treatment liquid. The content proportion of mannitol was adjusted to be 5 mass % with respect to the total amount of the treatment liquid.
(Impregnation and Drying of Treatment Liquid)

Subsequently, the capacitor element precursor was immersed in the treatment liquid stored in a predetermined container at room temperature under reduced pressure for 5 minutes. At this time, the capacitor element precursor was immersed in the treatment liquid from the side to which the lead tabs were not connected. Thereafter, the capacitor element precursor was pulled up from the treatment liquid.

Thereafter, the capacitor element precursor impregnated with the treatment liquid was dried in a drying furnace at 180° C. for 30 minutes. In this manner, the polyhydric alcohol and the conductive polymer were attached to the capacitor element precursor to cover the dielectric layer of the anode body.
(Impregnation with Liquid Component)

The capacitor element precursor was impregnated with γ-butyrolactone (GBL) as a liquid component at room temperature and atmospheric pressure.
(Sealing of Capacitor Element)

The capacitor element impregnated with the liquid component was sealed, whereby an electrolytic capacitor was completed. Thereafter, an aging treatment was performed at 130° C. for 2 hours while a rated voltage was applied to the electrolytic capacitor.
(Evaluation)

The initial ESR value and low-temperature characteristics of the obtained electrolytic capacitor were evaluated by the following procedure.

First, initial ESR value $X_1$ (me) at a frequency of 100 kHz was measured in an environment of 20° C. with an LCR meter for 4-terminal measurement.

Next, the electrolytic capacitor was charged at a rated voltage for 60 seconds in an environment of 20° C., and a current flowing when the rated voltage was applied to the charged electrolytic capacitor was measured and taken as initial leak current value $LC_0$.

Subsequently, the electrolytic capacitor was placed in an environment of −55° C. for 30 minutes. Thereafter, the electrolytic capacitor was placed in an environment of 125° C. for 30 minutes. These placements were regarded as 1 cycle, and the cycle was repeated 1000 times. The electrolytic capacitor after 1000 cycles of these placements was placed in an environment of 20° C., and the ESR was measured in the same manner as in the measurement of the initial ESR, and taken as ESR value X2 after the evaluation test. The ratio $X_2/X_1$ of the ESR value after the test to the initial ESR value was evaluated.

Examples 2 to 7

The polyhydric alcohol and the like to be added to the treatment liquid, the content proportion thereof, and the solvent of the liquid component in Example 1 were changed as shown in Table 1. An electrolytic capacitor was produced in the same manner as in Example 1 except for the above, and the electrolytic capacitor was evaluated in the same manner as in Example 1.

In Example 2, a mixed solvent obtained by mixing γ-butyrolactone (GBL) and sulfolane (SL) at a mass ratio of 50:50 was used as the liquid component. In Example 3, in addition to mannitol, mono(triethylamine)borodisalicylate (BSA/TEA) as the acid component was added to the treatment liquid at a content proportion of 3 mass % with respect to the total amount of the treatment liquid. In addition, a mixed solvent obtained by mixing γ-butyrolactone (GBL) and sulfolane (SL) at a mass ratio of 50:50 was used as the liquid component.

In Example 4, ethylene glycol (EG) was used as the liquid component. In Example 5, a mixed solvent obtained by mixing ethylene glycol (EG) and polyethylene glycol (PEG) (weight-average molecular weight: 200) at a mass ratio of 50:50 was used as the liquid component.

In Example 6, volemitol (VOL) as the polyhydric alcohol was added to the treatment liquid at a content proportion of 5 mass % with respect to the total amount of the treatment liquid, and ethylene glycol (EG) was used as the liquid component. In Example 7, xylitol (XYL) as the polyhydric alcohol was added to the treatment liquid at a content proportion of 5 mass % with respect to the total amount of the treatment liquid, and ethylene glycol (EG) was used as the liquid component. In Example 8, sorbitol (SOR) as the polyhydric alcohol was added to the treatment liquid at a content proportion of 5 mass % with respect to the total amount of the treatment liquid, and ethylene glycol (EG) was used as the liquid component. In Example 9, a mixed solvent obtained by mixing ethylene glycol (EG) and γ-butyrolactone (GBL) at a mass ratio of 30:70 was used as the liquid component.

Comparative Examples 1 to 3

No polyhydric alcohol was added to the treatment liquid. In Comparative Example 1, a solvent obtained by mixing γ-butyrolactone (GBL) and mannitol (MAN) at a mass ratio of 98:2 was used as the liquid component. In Comparative Example 2, GBL was used as the liquid component in the same manner as in Example 1. In Comparative Example 3, ethylene glycol (EG) was used as the liquid component. An electrolytic capacitor was produced in the same manner as in Example 1 except for the above, and the electrolytic capacitor was evaluated in the same manner as in Example 1.

Comparative Example 4

The same treatment liquid as in Example 1 except that no polyhydric alcohol was added and mono(triethylamine) borodisalicylate (BSA/TEA) was added as the acid component at a content proportion of 3 mass % with respect to the total amount of the treatment liquid was used.

An electrolytic capacitor was produced in the same manner as in Example 1 except for the above, and the electrolytic capacitor was evaluated in the same manner as in Example 1.

Comparative Example 5

An electrolytic capacitor (solid electrolytic capacitor) was produced without impregnation with the liquid component in Example 1, and was evaluated in the same manner as in Example 1.

Table 1 shows the polyhydric alcohol added to the treatment liquid in each electrolytic capacitor of Examples 1 to 9 and Comparative Examples 1 to 5, the acid component and the content proportion thereof, the composition of the liquid component, and the electric conductivity of the liquid component after the aging treatment. Table 2 shows evaluation results of the initial ESR and leak current in each electrolytic capacitor of Examples 1 to 9 and Comparative Examples 1 to 5.

TABLE 1

| | Treatment liquid | | Liquid component |
|---|---|---|---|
| | Polyhydric alcohol | Acid component | Solvent |
| Example 1 | MAN 5 mass % | — | GBL 100 mass % |
| Example 2 | MAN 5 mass % | — | GBL 50 mass % SL 50 mass % |
| Example 3 | MAN 5 mass % | BSA/TEA 3 mass % | GBL 50 mass % SL 50 mass % |
| Example 4 | MAN 5 mass % | — | EG 100 mass % |
| Example 5 | MAN 5 mass % | — | EG 50 mass % PEG 50 mass % |
| Example 6 | VOL 5 mass % | — | EG 100 mass % |
| Example 7 | XYL 5 mass % | — | EG 100 mass % |
| Example 8 | SOR 5 mass % | — | EG 100 mass % |
| Example 9 | MAN 5 mass % | — | EG 30 mass % GBL 70 mass % |
| Comparative Example 1 | — | — | GBL 98 mass % MAN 2 mass % |
| Comparative Example 2 | — | — | GBL 100 mass % |
| Comparative Example 3 | — | — | EG 100 mass % |
| Comparative Example 4 | — | BSA/TEA 3 mass % | GBL 100 mass % |
| Comparative Example 5 | MAN 5 mass % | — | — |

TABLE 2

| | Initial ESR $X_1$ (mΩ) | ESR change ratio $X_2/X_1$ |
|---|---|---|
| Example 1 | 12 | 1.8 |
| Example 2 | 14 | 2.1 |
| Example 3 | 11 | 1.6 |
| Example 4 | 22 | 1.3 |
| Example 5 | 24 | 1.5 |
| Example 6 | 24 | 1.9 |
| Example 7 | 29 | 2.9 |
| Example 8 | 28 | 2.8 |
| Example 9 | 14 | 1.8 |
| Comparative Example 1 | 32 | 4.0 |
| Comparative Example 2 | 31 | 4.8 |
| Comparative Example 3 | 35 | 8.5 |
| Comparative Example 4 | 22 | 3.4 |
| Comparative Example 5 | 38 | 3.9 |

Tables 1 and 2 show that the electrolytic capacitors of Examples 1 to 9 produced by impregnating the capacitor element precursor with a treatment liquid containing a conductive polymer and a polyhydric alcohol, then removing the solvent component of the treatment liquid by drying, and impregnating the capacitor element precursor with a liquid component has a smaller $LC_1/LC_0$ than the electrolytic capacitors of Comparative Examples 1 to 5, and the ESR after repeatedly passing through a high-temperature environment and a low-temperature environment is inhibited from increasing. The initial ESR is also low.

In Examples 1 to 3, an aprotic solvent or a mixed solvent of an aprotic solvent is used as the solvent of the treatment liquid. In this case, since the polyhydric alcohol is hardly eluted, most of the polyhydric alcohol is unevenly much distributed on the surface of the anode body and in the conductive polymer layer. In this case, the conductive polymer layer (solid electrolyte layer) has good adhesion to the anode body, and a decrease in the initial ESR is remarkable.

In Examples 4 to 6, a protic solvent or a mixed solvent of protic solvents is used as the solvent of the treatment liquid. In this case, the polyhydric alcohol tends to be eluted, and the concentration of the polyhydric alcohol present in the liquid component is higher than that in Examples 1 to 3. In this case, the ESR change ratio $X_2/X_1$ tends to be smaller than that in Examples 1 to 3.

In Examples 7 and 8, the initial ESR and $X_2/X_1$ slightly increased as compared with Examples 1 to 6. The reason for this is considered to be that the melting points (xylitol 94° C., sorbitol 95° C.) of the polyhydric alcohols used in Examples 7 and 8 are lower than the melting points (mannitol 167° C., volemitol 152° C.) of the polyhydric alcohols used in Examples 1 to 6. The melting point of the polyhydric alcohol is preferably higher than or equal to 100° C., and more preferably higher than or equal to 150° C.

In Example 9, a mixed solvent of a protic solvent and an aprotic solvent is used as the solvent of the treatment liquid. In this case, it was possible to lower the initial ESR and lower $X_2/X_1$.

The present invention can be used for a hybrid electrolytic capacitor using a conductive polymer and a liquid component.

What is claimed is:

1. A method for producing an electrolytic capacitor, the electrolytic capacitor including a capacitor element including an anode body and a cathode body each having a foil shape, the anode body including a dielectric layer on a surface of the anode body, the method comprising:
    forming a capacitor element precursor by winding or stacking a separator, the anode body, and the cathode body with the separator interposed between the anode body and the cathode body;
    impregnating the capacitor element precursor with a treatment liquid containing a polyhydric alcohol, a solvent, and a conductive polymer component;
    impregnating the capacitor element precursor with a liquid component after the impregnating of the capacitor element precursor with the treatment liquid; and
    forming the capacitor element by dissolving a part of the polyhydric alcohol into the liquid component, wherein:
    the liquid component contains an aprotic solvent,
    a content proportion of the aprotic solvent in the liquid component in the impregnating of the capacitor element precursor with the liquid component is more than or equal to 50 mass %, and
    after the forming of the capacitor element, a content proportion of the polyhydric alcohol in a total amount of the liquid component ranges from 0.1 mass % to 1 mass %, inclusive, and an electric conductivity X2 of the liquid component in which the part of the polyhydric alcohol has been dissolved ranges from 0.1 μS/cm to 500 μS/cm, inclusive.

2. The method according to claim 1, wherein in the impregnating of the capacitor element precursor with the liquid component, an electric conductivity X1 of the liquid component is less than or equal to 1 μS/cm.

3. The method according to claim 1, wherein after the forming of the capacitor element, the electric conductivity X2 of the liquid component in which the part of the polyhydric alcohol has been dissolved is higher than an electric conductivity X1 of the liquid component in the impregnating of the capacitor element precursor with the liquid component.

4. The method according to claim 1, wherein the liquid component further contains a protic solvent.

5. The method according to claim 4, wherein a content proportion of the protic solvent in the liquid component in the impregnating of the capacitor element precursor with the liquid component is less than 50 mass %.

6. The method according to claim 1, wherein a content proportion of the polyhydric alcohol in the treatment liquid in the impregnating of the capacitor element precursor with the treatment liquid ranges from 0.1 mass % to 10 mass %, inclusive.

7. The method according to claim 1, wherein a melting point of the polyhydric alcohol is higher than or equal to 150° C.

8. The method according to claim 1, wherein:
    the treatment liquid in the impregnating of the capacitor element precursor with the treatment liquid contains an acid component, and
    a content proportion of the acid component in a total amount of the liquid component is less than or equal to 2 mass % after the forming of the capacitor element.

9. The method according to claim 1, further comprising removing the solvent by drying after the impregnating of the capacitor element precursor with the treatment liquid and before the impregnating of the capacitor element precursor with the liquid component, wherein a drying temperature in the removing of the solvent is higher than or equal to 150° C.

10. An electrolytic capacitor comprising a capacitor element, the capacitor element includes:
    a separator;
    an anode body and a cathode body each having a foil shape, the anode body and the cathode body facing each other with the separator disposed between the anode body and the cathode body;
    a solid electrolyte layer disposed between the anode body and the cathode body; and
    a liquid component, wherein:
    the solid electrolyte layer contains a polyhydric alcohol and a conductive polymer, the polyhydric alcohol is unevenly distributed in the solid electrolyte layer,
    the liquid component contains an aprotic solvent,
    a content proportion of the aprotic solvent in the liquid component is more than or equal to 50 mass %, and
    a content proportion of the polyhydric alcohol in the liquid component ranges from 0.1 mass % to 1 mass %, inclusive, and an electric conductivity of the liquid component ranges from 0.1 μS/cm to 500 μS/cm, inclusive.

\* \* \* \* \*